United States Patent [19]

Nagata

[11] Patent Number: 4,715,006

[45] Date of Patent: Dec. 22, 1987

[54] IMAGE FORMING APPARATUS

[75] Inventor: Satoshi Nagata, Tama, Japan

[73] Assignee: Canon Kabushiki Kaisha, Tokyo, Japan

[21] Appl. No.: 30,292

[22] Filed: Mar. 23, 1987

Related U.S. Application Data

[63] Continuation of Ser. No. 654,106, Sep. 25, 1984, abandoned.

[30] Foreign Application Priority Data

Sep. 30, 1983 [JP] Japan ................ 58-180670
Jan. 31, 1984 [JP] Japan ................ 59-14297

[51] Int. Cl.$^4$ .............................. B41B 25/08
[52] U.S. Cl. ........................... 364/523; 346/45; 346/154
[58] Field of Search ............ 364/523, 518, 519; 346/154, 45, 149; 400/69, 70, 72

[56] References Cited

U.S. PATENT DOCUMENTS

| | | | |
|---|---|---|---|
| 3,167,746 | 1/1965 | Reines et al. | 340/146.3 |
| 3,678,497 | 7/1972 | Watson et al. | 340/324 A |
| 4,234,931 | 11/1980 | Kanaiwa et al. | 364/900 |
| 4,241,340 | 12/1980 | Raney | 340/731 |
| 4,359,286 | 11/1982 | Barnes | 400/70 |
| 4,429,306 | 1/1984 | Macauley et al. | 340/790 |
| 4,439,761 | 3/1984 | Fleming et al. | 340/735 |

FOREIGN PATENT DOCUMENTS 2113153A 8/1983 United Kingdom ............... 364/523

Primary Examiner—Arthur G. Evans
Attorney, Agent, or Firm—Fitzpatrick, Cella, Harper & Scinto

[57] ABSTRACT

An image forming apparatus such as a dot printer has a built-in character generator built in the printer and for generating a standard type font pattern signal, a removable character generator removable from the printer and generating a specific type font pattern signal, a CPU for performing various control procedures, an output buffer for generating a dot pattern in accordance with the signal from either character generator, and a page printer for printing in accordance with the dot pattern from the output buffer. If a type font change is requested and a selected type font cannot be generated by either character generator, the corresponding portion is underlined or emphasized with other means.

18 Claims, 17 Drawing Figures

FIG. 1(a)  Excellence in typography is the
FIG. 1(b)  Excellence in typoqraphy is the
FIG. 1(c)  *Excellence in typoqraphy is the*

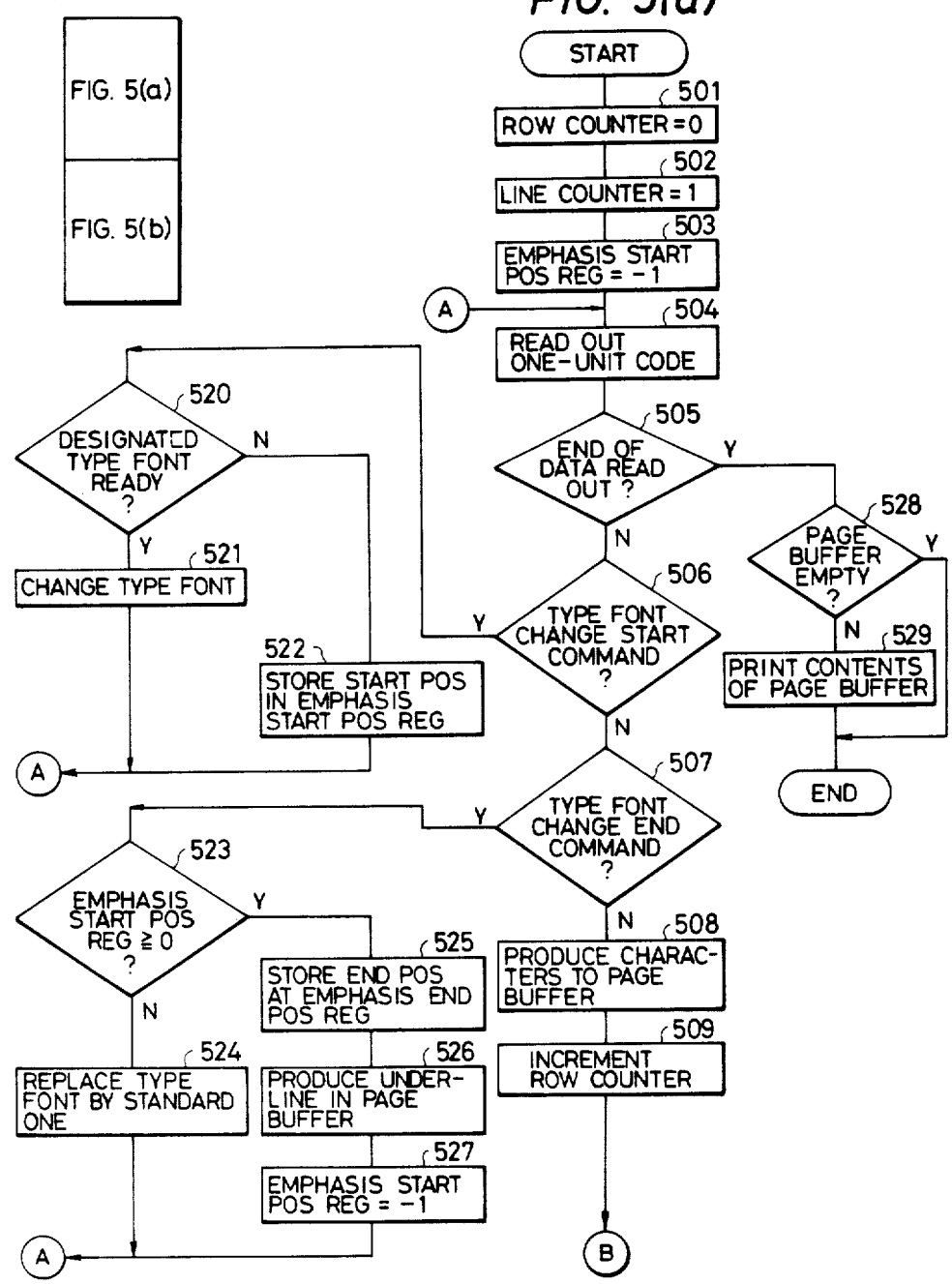

IMAGE FORMING APPARATUS

This application is a continuation of application Ser. No. 654,106 filed Sept. 25, 1984, now abandoned.

BACKGROUND OF THE INVENTION

1. Field of the Invention

The present invention relates to an image forming apparatus for generating a plurality of image patterns.

2. Description of the Prior Art

Among conventional output devices for generating a plurality of different patterns, a conventional output device is known which generates a plurality of patterns in a dot pattern instead of printing the patterns by an element or wheel printer. In this apparatus, character code data supplied from a host computer or the like is converted by a character generator to a character dot pattern corresponding to each character code data, and the character dot pattern is generated. The output device of this type can be exemplified by output devices in non-impact printers such as a thermal printer, wire-dot printer, or a laser beam printer.

In these conventional printers, a character generator often generates different type fonts (character patterns) to print different types of characters having different type fonts. In particular, such a character generator tends to be built into a printer for printing English letters since the number of English letters is small. Furthermore, a ROM or RAM cartridge as a character generator is detachably mounted in an output device through a socket, so that a user will be able to select any type font.

The change in type font is performed in many occasions. A bold type font shown in FIG. 1(b) or an italic type font shown in FIG. 1(c) is frequently used in place of the standard type font shown in FIG. 1(a). The bold type font is expressed by increasing a thickness of a line constituting a character. The italic type font is expressed by inclining the character and is used for an emphasis of a character string. More particularly, a change from the standard type font to another type font is performed such that a type font change command is supplied to a printer and an address of the character generator which is specified by the desired type font is changed.

The following problem occurs in the printing device having the removable character generator and any other conventional printing device. When the number of necessary type fonts is increased, a character generator must be able to generate all the required type fonts. As a result, the circuit of the character generator becomes complicated, and the size thereof is increased.

When a specified type font upon reception of a type font change command is not stored in the removable character generator, or when the specified type font is not preset in a character generator in a printer, no means is provided to change the type font and emphasize the line constituting the character in conventional printing devices. In order to overcome this, the following operations are conventionally performed:

(1) A message representing that the specified type font data is not stored is displayed, and printing is completed.

(2) The type font change command is neglected, and the currently used type font is continuously used.

For these reasons, the type font change as the primary object cannot be performed. In addition to this disadvantage, the character string cannot be emphasized.

SUMMARY OF THE INVENTION

It is an object of the present invention to provide an image forming apparatus which eliminates the conventional drawbacks.

It is another object of the present invention to provide an improvement in an image forming apparatus for generating a plurality of image patterns.

It is still another object of the present invention to provide an image forming apparatus capable of changing the type of pattern such as a partial change in type font.

It is still another object of the present invention to provide a printer having a single image pattern generator and another pattern generator detachably mounted in the printer.

It is still another object of the present invention to provide a printer wherein a plurality of pattern generators are switched within one page.

It is still another object of the present invention to continuously generate an image such as a sentence by using any pattern generating means even if a required pattern generator is not arranged in the image forming apparatus.

It is still another object of the present invention to continuously print a pattern even if a removable pattern generator is not mounted.

It is still another object of the present invention to provide a means for underlining a pattern string to be modified to allow continuous printing without interferring with pattern emphasis as a primary object when a pattern change request is received but a removable pattern generator including the specified pattern is not mounted.

It is still another object of the present invention to provide an output device for producing the same pattern output as in the case wherein a required pattern generator is mounted, thereby generating a quasipattern in accordance with a standard pattern from a standard pattern generating means when a removable pattern generating means is not mounted.

It is still another object of the present invention to provide an output device for generating a bold type font by properly shifting the standard pattern to overlap the patterns to generate a quasipattern.

It is still another object of the present invention to provide an output device for generating an italic type font by developing a standard pattern, inclining it at a predetermined angle, and thereby generating a quasipattern.

BRIEF DESCRIPTION OF THE DRAWINGS

FIGS. 1(a) to 1(c) are respectively representations for explaining normal type fonts, in which FIG. 1(a) shows a standard type font, FIG. 1(b) shows a bold type font, and FIG. 1(c) shows an italic type font;

FIGS. 5(a) and 5(b) are flow charts for explaining the main operation of a CPU according to the embodiment of the present invention;

FIGS. 9 (a) to 9(c) are representations showing outputs represented by different type fonts, in which

DETAILED DESCRIPTION OF THE PREFERRED EMBODIMENTS

An embodiment of the present invention will be described with reference to the accompanying drawings in the same manner as in the conventional examples.

Figure 2:
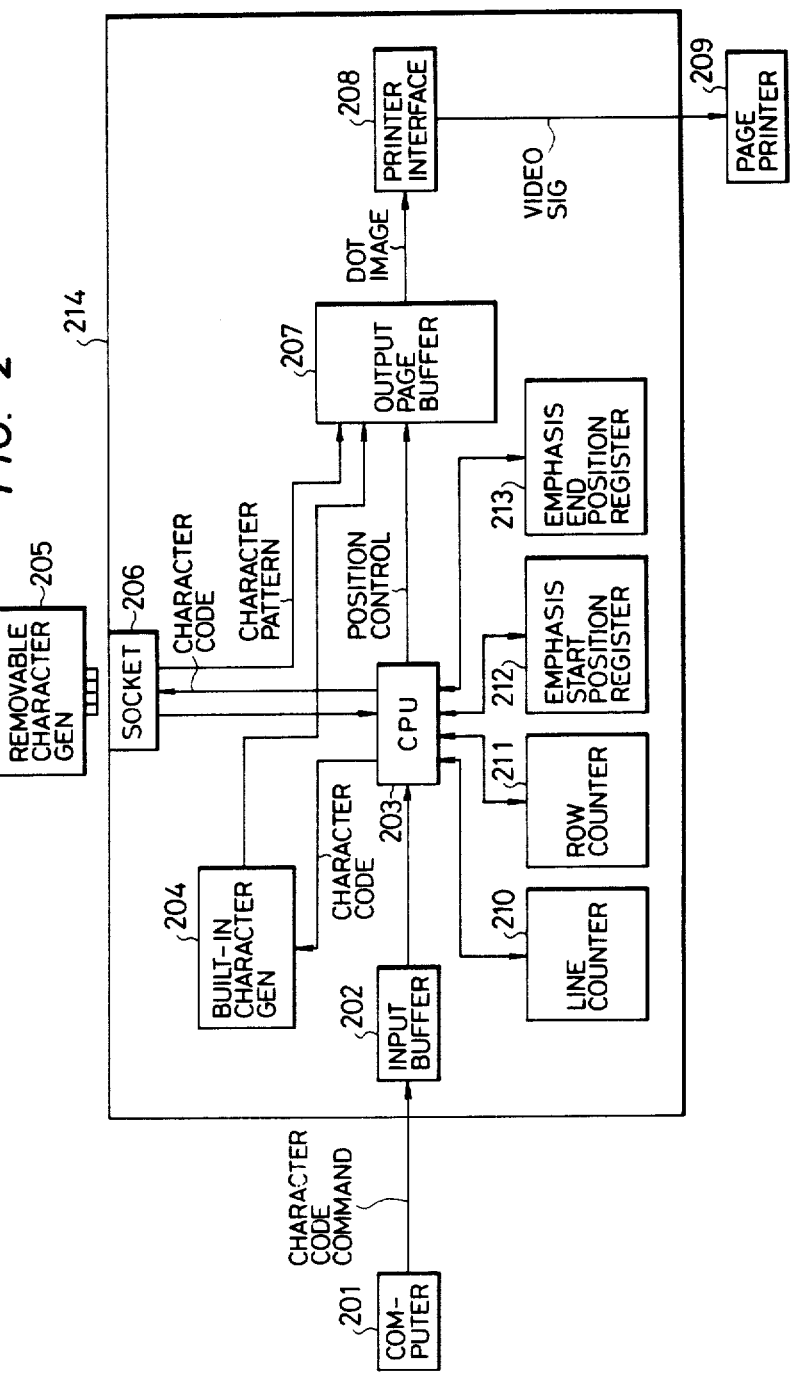
FIG. 2 is a block diagram of an image forming apparatus associated with a given type font according to an embodiment of the present invention.

FIGS. 1(a) to 1(c) show the normal type fonts. FIG. 2 is a block diagram of a control mechanism of an image forming apparatus according to the embodiment of the present invention. The control mechanism receives character code data and a control command from a host computer or the like and causes a page printer such as a laser beam printer to print the character code data. A computer 201 as a host computer generates the character code data and the control command. An input buffer 202 temporarily stores the data and the control command. A CPU 203 comprises a general-purpose microprocessor. A built-in character generator 204 generates a desired character dot pattern in accordance with character code data. A removable character generator 205 is of a cartridge type. A socket 206 is used to connect the character generator 205. An output page buffer 207 comprises a RAM for storing a one-page dot pattern. A printer interface 208 generates a video signal in response to the dot pattern data from the output page buffer 207 and interfaces the control mechanism with a page printer 209. The page printer 209 receives the video signal from the printer interface 208 and prints image information represented by the video signal. A line counter 210 stores a line address of the output page buffer 207. A row or column counter 211 stores a row address of the page buffer 207. An emphasis start position register 212 stores position data representing a start position of an underline portion corresponding to a type font change request. An emphasis end position register 213 stores position data representing an end position of the underline portion. A CPU board 214 is connected to the above-mentioned components of the control mechanism.

Figure 3:
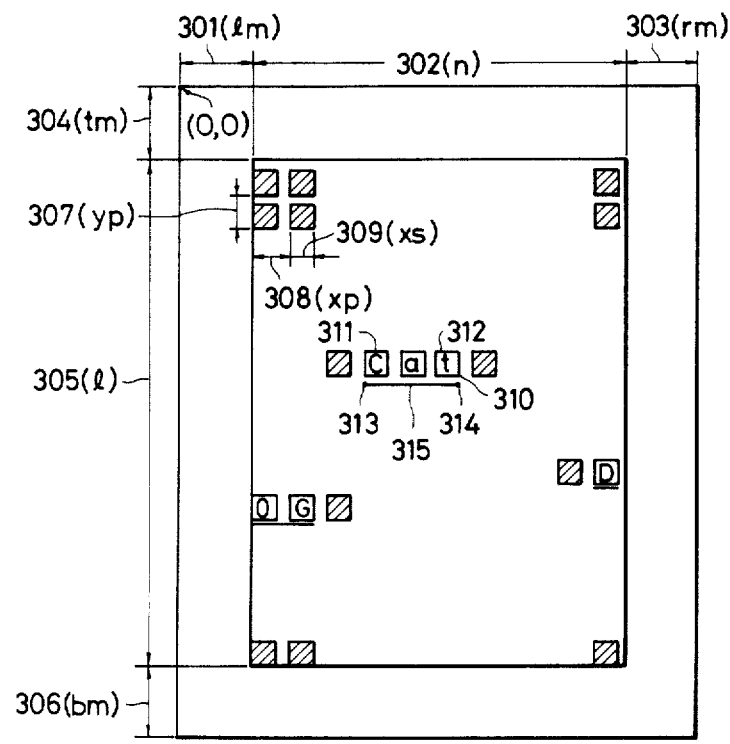
FIG. 3 is a representation showing a page print layout according to the embodiment of the present invention.
Figure 4:
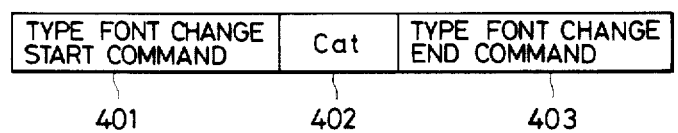
FIG. 4 shows a format of a type font change control command.
Figure 5B:
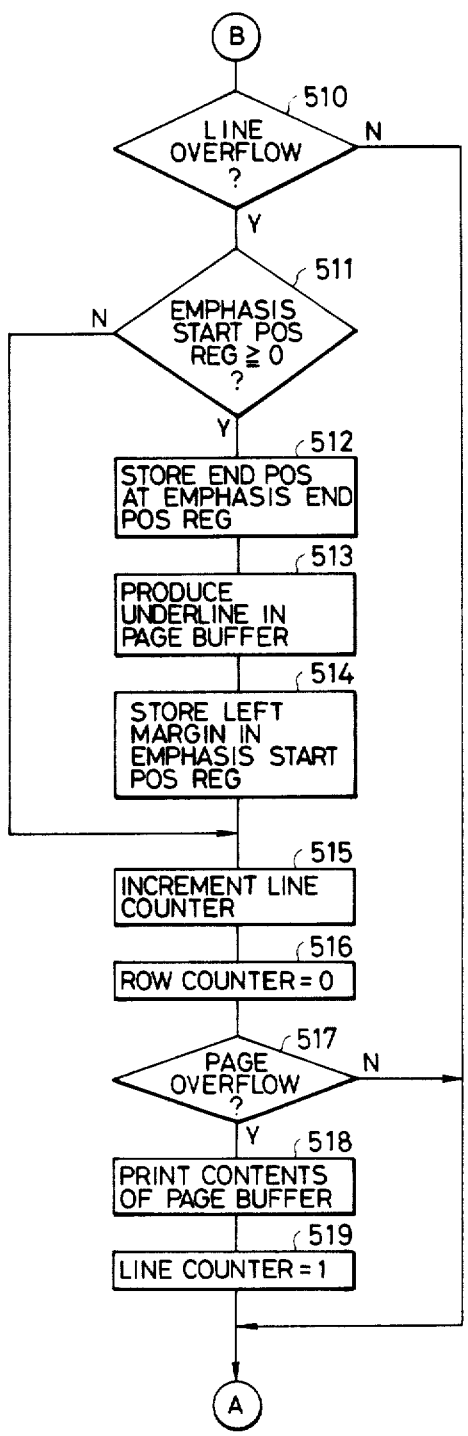

FIG. 3 shows a page print layout of the image forming apparatus according to this embodiment, FIG. 4 shows a format of a control command, and FIGS. 5(a) and 5(b) are flow charts for explaining the main operation of the CPU 203.

The operation of the image forming apparatus shown in FIG. 2 will be described below.

Referring to FIG. 2 the character code data and the type font command from the computer 201 are accumulated in the input buffer 202.

The format for designating the type font in the image forming apparatus according to this embodiment is illustrated in FIG. 4.

In normal operation, a character code is supplied to the built-in character generator 204, and a standard character pattern represented by the type font in FIG. 1(a) is generated from the built-in character generator 204. This character pattern data is written in the output page buffer 207 and is read out as a dot image to the page printer 209 through the printer interface 208. In this case, when the type font change format data is supplied, a type font change start command 401 sandwiches a character string (TEXT) 402 with a type font change end command 403, includes a content for designating the type font pattern, and causes the removable character generator 205 to generate a designated type font pattern for the character string 402. The type font change end command 403 represents that the character pattern is restored to the type font (i.e., the standard character pattern) before the type font change start command is generated.

The character code data and the type font change commands which are stored in the input buffer 202 are read out for every one-unit code. Each one-unit code is retrieved by the CPU 203 and is processed in accordance with the flow chart in FIGS. 5(a) and 5(b).

Referring to FIGS. 5(a) and 5(b), the CPU 203 initializes the row counter 211 designating the horizontal printing position in step 501 and the line counter 210 for designating the vertical printing position in step 502. In step 503, the CPU 203 sets a negative value in the emphasis start position register 212 to initialize the emphasis start position register 212 for representing the start position of a portion to be underlined.

When the above initialization operations are completed, the CPU 203 reads out a one-unit code from the input buffer 202 in step 504. The CPU 203 then checks in step 505 whether or not the data is completely read out. If NO in step 505, the CPU checks in step 506 whether or not the type font change start command is generated, and in step 507 whether or not the type font change end command is generated. If NO in steps 506 and 507, the flow advances to step 508. In step 508, the CPU 203 supplies a character dot pattern corresponding to the character code to the output page buffer 207. The character code data becomes an address of the built-in character generator 204 comprising a RAM or ROM for storing dot patterns of the respective characters of the standard type font (first pattern). Therefore, the character dot pattern generated from the built-in character generator 204 is optimally accessed (to be described in detail later) by the CPU 203. One-character data is converted by the output page buffer 207 to dots constituting an image. The type font stored in the built-in character generator may be of any standard type. In this embodiment, an "elite" type font is used as the standard type font, as shown in FIG. 1(a).

The position of a generated character will be described with reference to FIG. 3. The format shown in FIG. 3 comprises a left margin row number 301(lm), a body row number 302(n), a right margin row number 303(rm), an upper margin line number 304(tm), a body line number 305(l) a lower margin line number 306(bm), a line pitch dot number 307(yp), a character pitch dot number 308(xp), and a horizontal character width dot number 309(xs). Assume that the upper left corner of the page is given as an origin (0,0), that a count of the row counter 211 is given as Xc, and that a count of the line counter 212 is given as Yc. The lower right corner position (x0,y0) of the character dot pattern of the generated character is given by the following coordinates:

$$x0=(lm+Xc)\times xp$$

$$y0=(tm+Yc)\times yp$$

When the counts Xc and Yc change, the position of the generated character is determined.

In step 508, the character is generated in the manner as described above. In step 509, the count of the row counter 211 is incremented by one. In step 510, the CPU 203 checks whether or not a line overflow occurs. If NO in step 510, that is, when the count of the row counter 211 is smaller than the body row number 302(n), the flow returns to step 504 and the next one-unit code is read out.

The characters are sequentially generated in the same manner as described above. When a line flow occurs in step 510, that is, when the count of the row counter 211 has reached the body row number 302(n), the CPU 203 checks in step 511 whether or not the emphasis start position register 212 is equal to or larger than 0. In this case, the count of this register is kept at the initial value, that is, a negative value. The flow thus jumps to step 515. In step 515, the count of the line counter 210 is incremented by one. In step 516, the row counter is initialized. The CPU 203 then checks in step 517 whether or not a page overflow occurs. If NO in step 517, that is, when the count of the line counter 21 is equal to or smaller than the body line number 305(l), the CPU 203 detects that the output page buffer is not full. The flow returns to step 504, and the one-unit code is read out to the output page buffer 207. However, if YES in step 517, that is, when the count of the line counter 210 is larger than the body line number 305(l), the CPU 203 determines that one-page conversion operation of the output page buffer 207 is completed. The dot image data is supplied to the printer interface in units of scanning lines. The dot image data is converted by the printer interface 207 to a video signal. The video signal is printed at the page printer 209.

In the same manner as described above, steps 504 to 519 are repeated to generate page data.

Processing will be described when a type font change command is generated.

When the type font change start command 401 is retrieved in the CPU 203, this command is detected in step 506. The flow then advances to step 520. The CPU 203 checks in step 520 whether or not a character generator for generating the designated type font (second pattern) is mounted in the image forming apparatus, that is, whether or not the designated type font is ready. This can be detected by retrieving the data from a specific area of the ROM in the removable character generator 205. A unique code representing the content of the type font is stored in the specific area. The CPU 203 checks whether or not the data from the specific area coincides with the type font change start command 401. When the removable character generator 205 is not connected through the socket 206, the data from the specific area is read out. In this case, an indefinite bit pattern is generated so the CPU can properly discriminate the coincidence. When the type font change can be performed in accordance with the discriminated result, the count of the base register in the CPU 203 which addresses the built-in character generator 204 is updated for the removable character generator 205. The flow returns to the step 504, and the next one-unit code processing is started. Thereafter, printing is continuously performed by using the removable character generator 205 until the type font change end command 403 is retrieved in the CPU 203. When the type font change end command 403 is received by the CPU 203, the CPU 203 detects it in step 507. The CPU 203 then checks in step 523 whether or not the value of the emphasis start position register 212 is set at a negative value. When the type font change start command is generated, and the designated type font can be used, the emphasis start position register 212 is kept inactive in the same manner as in the case wherein the type font change start command has not been generated. The emphasis start position register 212 is set at the initial value, i.e., the negative value. The flow advances to step 524. The operation in step 524 is opposite to that in step 521. More specifically, although the value of the base register in the CPU 203 is used as the address of the removable character generator, the address is updated for the built-in character generator 204. The flow then returns to step 504, and the next one-unit code is processed. Thereafter, the type font stored in the built-in character generator is used.

Assume that the type font change position command as the main feature of the present invention is generated, and that a type font designated by this command is not contained in the character generator mounted in the image forming apparatus. This operation will be described in detail later.

When the type font change start command 401 is retrieved in the CPU 203, it is detected in step 506. The CPU 203 checks in step 520 whether or not the character generator for storing the designated type font is mounted in the image forming apparatus. In this case, the corresponding character generator is not mounted. In step 522, the horizontal position start position of an underline portion instead of changing the type font is calculated in step 522. This position data is stored in the emphasis start position register 212.

Referring to FIG. 3, character "c" represented by reference numeral 311 is given as the start character of a character string whose type font must be changed. In this case, when the corresponding count of the row counter 211 is given as Xc, the left margin row number is given to be lm, and the character pitch dot number is given to be xp, an x1 coordinate of an underline start position 313 (x1, y1) with respect to the origin (0,0) of the upper left end is calculated as follows:

$$x1=(lm+Xc-1)\times i\ xp$$

The calculation result is stored in the emphasis start position register 212. The flow returns to step 504, and the next one-unit code is processed. Thereafter, the type font will not change, that is, the character dot pattern is generated from the built-in character generator. This operation continues until the type font change end command 403 is generated.

When the type font change end command 403 is retrieved by the CPU 203, this command is detected in step 523, and the content of the emphasis start position register 212 is checked. Since the value more than 0 is stored in the emphasis start position register 212 in step 522, the flow advances to step 525. In step 525, the horizontal end position of the underline portion is calculated in the following manner, and the calculated value is stored in the emphasis end register 213.

As in the case of the emphasis start position as described above, a letter "t" indicated by reference numeral 312 is determined to be the last letter of the character string for which a type font change has been requested. In this case, the value of the row counter 211 is given as Xc, the character pitch dot number is given by xp, the character width dot number in the horizontal direction is given by xs, and the left margin row number is given by lm. Then, a coordinate x2 of an underline end position 314 (x2, y1) with reference to the origin (0, 0) at the upper left corner of the page is given by:

$$x2 = (lm + Xc - 1) \times xp + xs$$

The calculated coordinate is stored in the emphasis end position register 213. Then, the flow advances to step 526, and processing for allowing the output page buffer 207 to produce a horizontal line corresponding to the underline is executed.

The vertical position may be determined in the following manner. The upper margin line number is given as tm, the line pitch dot number is given as yp, and the interval dot number between the character pattern and the underline is given by U. Then, a coordinate y1 of the underline start position (x1, y1) and the underline end position (x1, y2) is given by:

$$y1 = (tm + Yc) \times yp + U$$

Note that U is a constant. A line is drawn from the coordinate point (x1, y1) to coordinate point (x2, y1) with consecutive dots using registers in the CPU 203 and without using a character generator.

After an underline 315 is supplied to the output page buffer 207 in this manner, the emphasis start position register 212 is reset to the initial value in step 527. The underline generating processing is completed in this manner and the flow returns to step 504.

The above-mentioned processing is adopted when a character string for which a type font change has been requested can be printed within one line, for example, "cat" shown in FIG. 3. However, if a character string for which a type font change has been requested must be printed on two lines such as "dog" in FIG. 3, overflow processing must be performed in addition to the above-mentioned processing. The process of storing the start position in the emphasis start position register is the same as that described above. However, after the underline end position is calculated, underline generating processing for the current line must first be performed. More specifically, when an overflow is determined in step 510, the contents of the emphasis start position register 212 are checked in step 511. Since a value larger than 0 is stored in the register 212, processing in steps 512 and thereafter is performed. In step 512, the underline end position is calculated in accordance with the same equation as that used in step 525, and the calculated value is stored in the emphasis end position register 213. In step 513, an underline is supplied to the output page buffer 207 in the same manner as in step 526. Thereafter, in step 514, in order to generate an underline in the next line, the left margin dot number lm (301) is stored in the emphasis start position register 212. Thereafter, when the type font change end position command 403 is received in the next line, the underline is generated in the same manner as described above.

In accordance with the processing flow as described above, printing is performed in response to a type font change command and character code data. When information indicating a data end (e.g., a code representing an end of a task, a code representing an end of a file, or the like) is detected in step 505, the flow goes to steps 528 and 529. If the output page buffer 207 is not empty, that is, when the line counter 210 is 2 or more or the row counter is 1 or more, the contents in the output page buffer 207 are printed. The entire processing is then ended.

In this embodiment, a case of English horizontal printing is considered as an example of printing formats. However, the present invention can be easily applied to Japanese vertical printing. When vertical printing is to be performed, an underline in the case of horizontal printing can be replaced with a right line to emphasis a document portion having this right line attached thereto. It is also possible to print inverted characters in place of underlining these characters to be emphasized. When the use of a selected type font is impossible, a corresponding message can be produced with a display and the underline can be printed in accordance with a response from the operator, instead of simply generating an underline as in this embodiment. In this case, the output apparatus preferably provides alternatives of: (1) continue printing, (2) underline corresponding portion, and (3) stop printing.

Figure 6:
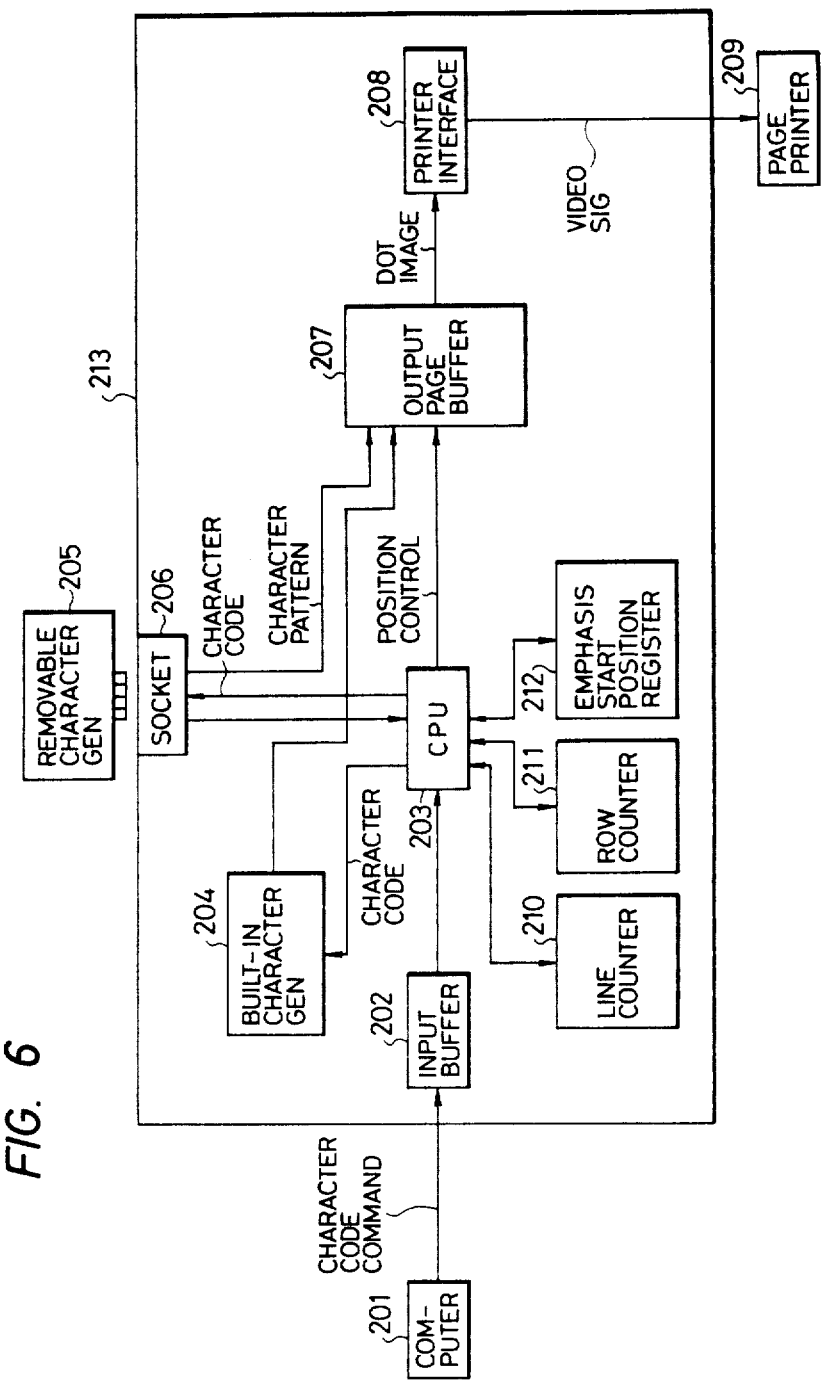
FIG. 6 is a block diagram of an image forming apparatus according to another embodiment of the present invention.

FIG. 6 shows an image forming apparatus according to another embodiment of the present invention. The reference numerals 201 to 211 denote the same parts as in FIG. 2. An emphasis start position register 212 designates a start position of a quasipattern from a pattern received from the built-in character generator 204. A CPU board 213 has the control mechanism mounted thereon. The type font designation format is the same as that illustrated in FIG. 4.

Figure 7:
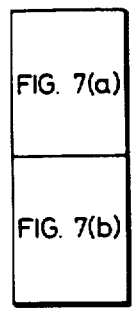
FIGS. 7(a) and 7(b) are flow charts for explaining the character pattern development control according to the apparatus shown in FIG. 6.

In accordance with the flow chart shown in FIG. 7, the character code data stored in the input buffer 202 is converted into character code data which is stored in the output page buffer 207. The character pattern data is then printed by the page printer 209. This will be described below.

Figure 7A:
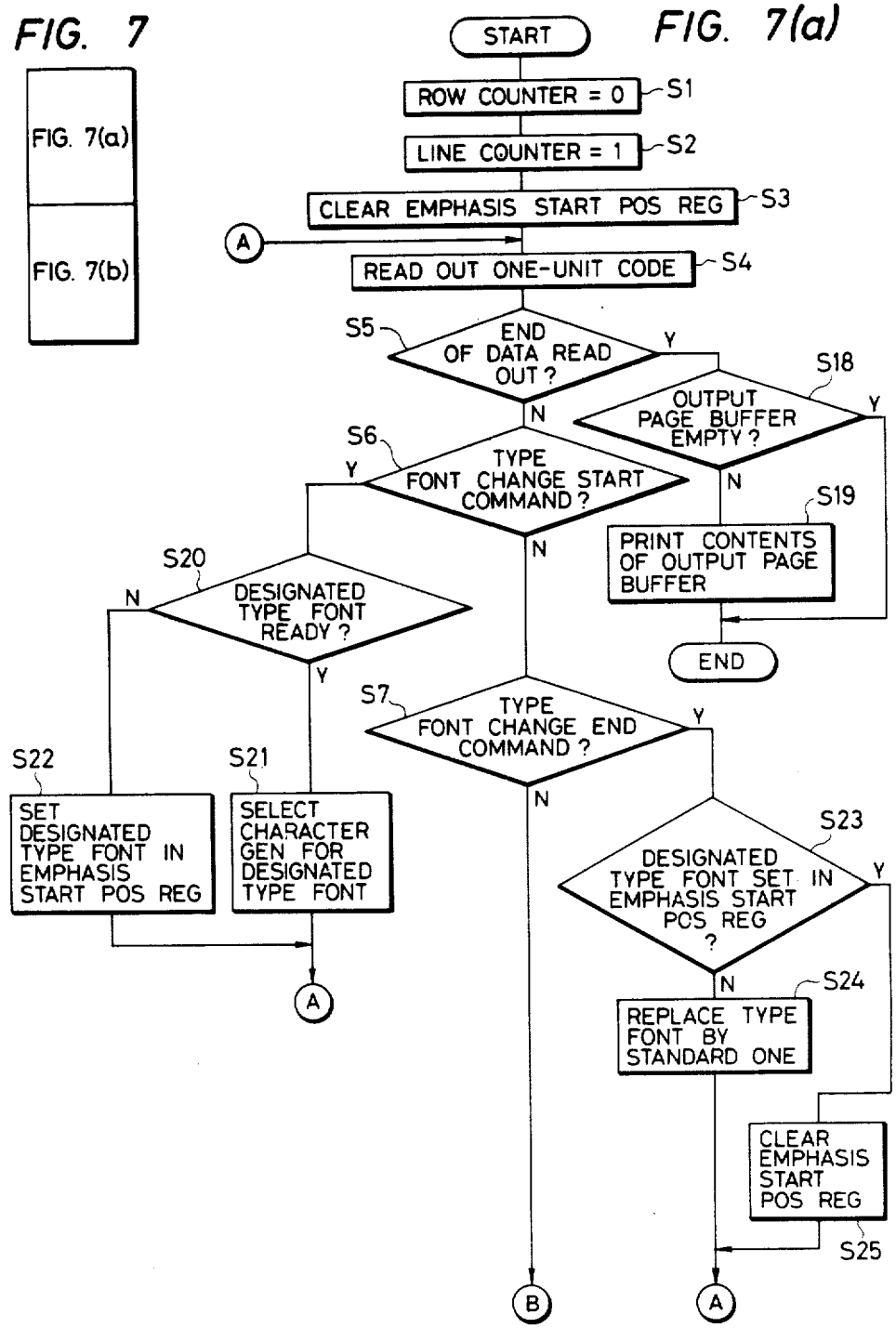
Figure 7B:
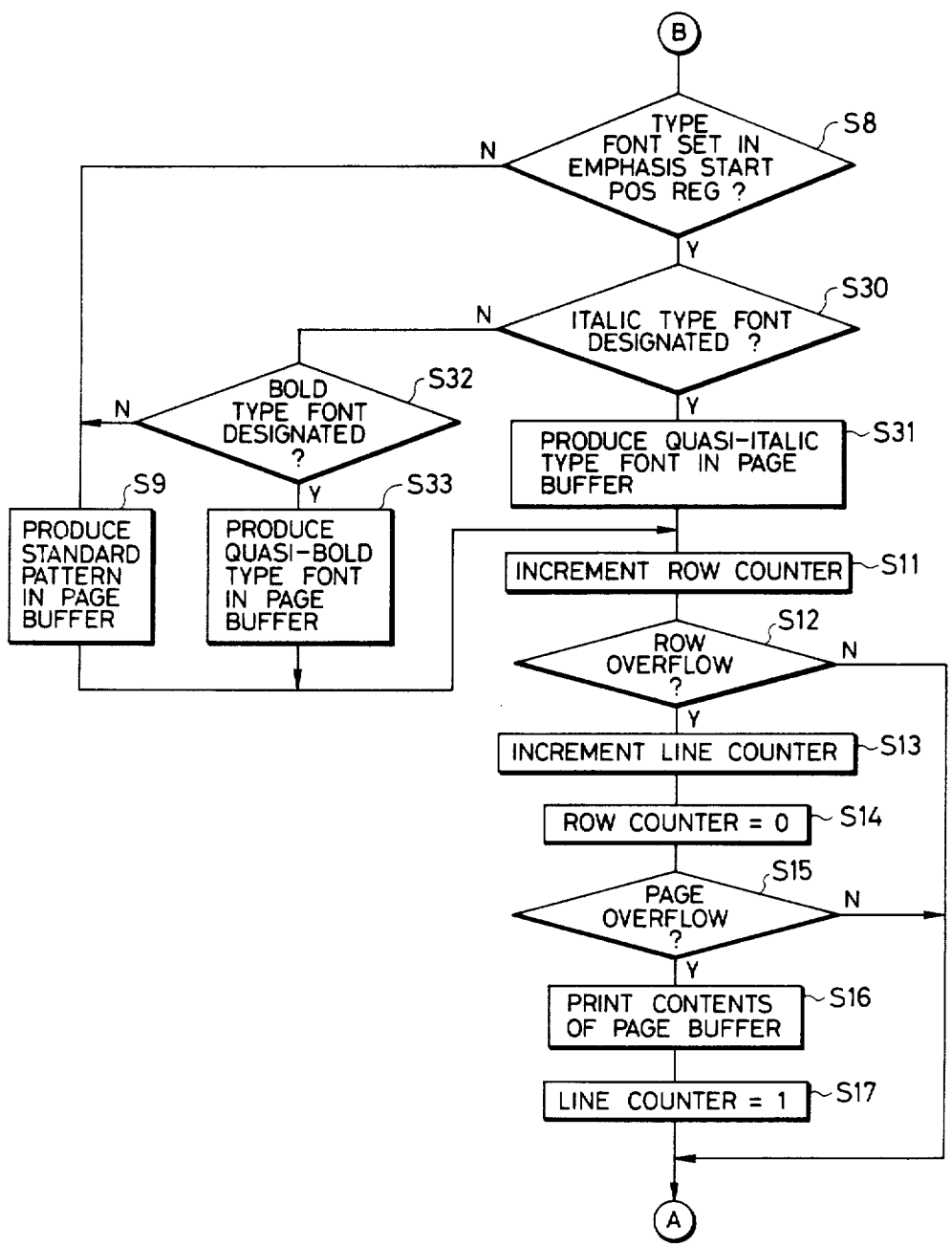

Referring to FIGS. 7(a) and 7(b), the CPU 203 initializes the row counter 211 indicating the horizontal printing position and the line counter 210 indicating the vertical printing position, in steps S1 and S2. In step S3, the emphasis start position register 212 indicating the start position of a quasipattern designated by a standard character pattern is initialized.

After these initialization procedures are completed, the CPU 204 retrieved a one-unit code from the input buffer 202 in step S4. In step S5, the CPU 203 checks if a data end is detected. If NO in step S5, the CPU 203 checks if the read code is a command associated with a type font change, in steps S6 and S7. If NO in steps S6 and S7, the flow advances to step S8, and the emphasis start position register is checked. Since "0" is normally set in the emphasis start position register, the flow advances to step S9. In step S9, a character dot pattern corresponding to this character code is supplied to the output page buffer 207. The character code data is supplied to a designated character generator and is used to generate a corresponding dot pattern. During a type font change shown in FIG. 3, the removable character generator 205 generates a character dot pattern. In other cases, the built-in character generator 204 generates a character dot pattern. Since the control procedures in both cases are substantially the same, a case of generating a dot pattern from the built-in character generator 204 will be described below.

The character code data is supplied as an address of the built-in character generator 204 comprising a RAM or ROM storing dot patterns of respective characters. A character dot pattern generating by the built-in character generator 204 is positioned porperly by the CPU 203 as will be described later. The pattern of one character is formed as a dot image in the output page buffer 207. The type font stored in the built-in character generator 204 need not be limited to any specific type font as long as it is of standard type.

The position of the character to be generated next will be described with reference to FIG. 8.

Figure 8:
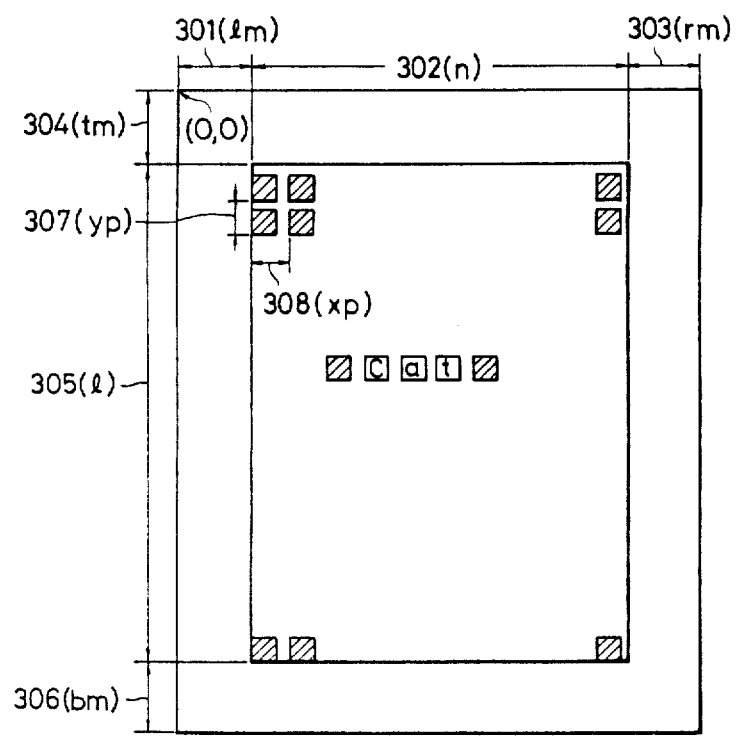
FIG. 8 is a representation of a page layout of an output from the apparatus shown in FIG. 6.

FIG. 8 is a representation showing a page layout of the page printer 209 in this embodiment. The format comprises a left margin row number 301($lm$), a body row number 302($n$), a right margin row number 303($rm$), an upper margin line number 304($tm$), a body line number 305($l$), a lower margin line number 306($bm$), a line pitch dot number 307($yp$), and a character pitch dot number 308($xp$). Assume that the upper left corner of the page is given as an origin (0, 0), the value of the row counter 211 is given as Sc, and the value of the line counter is given as Yc. Then, lower right corner position (x0, y0) of the character dot pattern of the generated character is given by:

$$x0 = (lm + Xc) \times xp$$

$$y0 = (tm + Yc) \times yp$$

When the counts Xc and Yc change, the position of the generated character is determined.

After the character is generated in step S9 in this manner, the count of the row counter 211 is incremented by 1. In step S12, an overflow is checked. If NO in step S12, that is, if the count of the row counter 211 is smaller than the body row number (n) 302, the flow returns to step S4. In step S4, the next one-unit code is read.

Characters are generated in a similar manner. When an overflow is detected in step S12, that is, when the count of the row counter 211 has reached the body row number (n) 302, the flow advances to step S13. In step S13, the count of the line counter 210 is incremented by one. After the row counter 211 is initialized in step S14, a page overflow is checked in step S15. If No in step S15, that is, when the count of the line counter 210 is equal to or smaller than the body line number 305, it is determined that the output page buffer can store more data. Then, the flow returns to step S4 and the processing of the output page buffer 207 is continued. When a page overflow is determined in step S15, that is, when the count of the line counter 210 is larger than the body row number (l) 305, it is determined that the generation of the output page buffer 207 has been completed. Then, the dot image of each scan line is converted into a video signal by the printer interface 207. The page printer 209 prints in accordance with the video signal.

Pages are printed by repeating steps S4 to S17 in this manner.

Processing when a type font change is requested will be described below.

When it is determined in step S6 that the character code read from the input buffer is a type font change start command 401, the flow advances to step S20. In step S20, the CPU 203 checks if the removable character generator 205 is mounted, and if the generator is a generator corresponding to a designated type font, that is, whether or not the designated type font is ready. This can be detected by retrieving the data from a specific area of the ROM in the removable character generator 205. A unique code representing the content of the type font is stored in the specific area. The CPU 203 checks whether or not the data from the specific area coincides with the type font change start command 401. When the removable character generator 205 is not connected through the socket 206, the data from the specific area is read out. However, a code representing the above type font cannot be read, and discrimination of the type font is not interfered with. When the type font change can be performed in accordance with the discriminated result, the count of the base register in the CPU 203 which addresses the built-in character generator 204 is updated for the removable character generator 205. The flow returns to the step S4, and the next one-unit code processing is started. Thereafter, printing is continuously performed by using the removable character generator 205 until the type font change end command 403 is retrieved in the CPU 203.

When the type font change end command 403 is received by the CPU 203, the CPU 203 detects it in step S7. The CPU 203 then checks in step S23 whether or not the value of the emphasis start position register 212 is set at a negative value. When the type font change start command is generated and the designated type font can be used, the emphasis start position register 212 is kept inactive in the same manner as in the case wherein the type font change start command has not been generated. The emphasis start position register 212 is therefore set at the initial value, i.e., the negative value. The flow thus advances to step S24. The operation in step S24 is opposite to that in step S21. More specifically, although the value of the base register in the CPU 203 is used as the address of the removable character generator, the address is updated for the built-in character generator S4. The flow then returns to step S4, and the next one-unit code is processed. Thereafter, the type font stored in the built-in character generator is used.

Assume that the type font change position command as the main feature of the present invention is generated, and that a type font designated by this command is not contained in the character generator mounted in the image forming apparatus. This operation will be described in detail later.

Figure 9A:
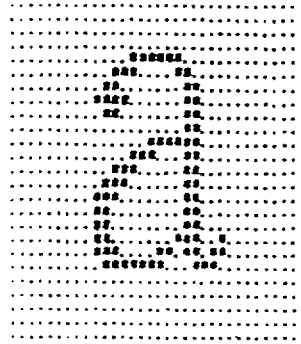
FIG. 9(a) shows a standard type font pattern.
Figure 9B:
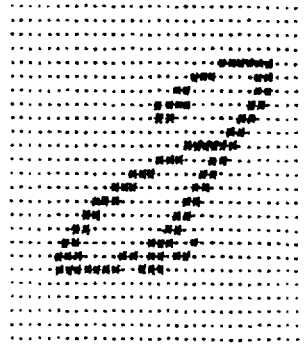
FIG. 9(b) shows a character pattern by a quasi-italic pattern of the standard character pattern.

In this case, in step S22, it is determined that the designated type font is set in the emphasis start position register 212. The flow advances from step S8 to step S30. It is checked in step S30 if the designated type font is the italic type font. If YES in step S30, the flow advances to step S31. In step S31, a character pattern is generated at a position (x0, y0) designated by the line and row counters 210 and 211. At this time, the storage position of the character pattern generated from the built-in character generator 204 in the output page buffer 207 is controlled, and the dot development is performed while inclining the generated character pattern. Using the lowermost line of the character pattern, the pattern is generated by shifting the pattern to the right by one dot in the second line from the bottom. The pattern is generated by shifting the pattern to the right by n dots in the nth line from the bottom. In this manner, a quasi-italic pattern inclined as shown in FIG. 9($b$) is developed in the output page buffer 207.

In this manner, even if the designated type font of the emphasis start position register 212 is the italic type font and a character generator for generating the italic type font is not mounted, a quasi-italic pattern is developed in the output page buffer 207 and is supplied to the printer interface 208 as a dot image. The flow then advances to steps S11 and S12.

Figure 9C:
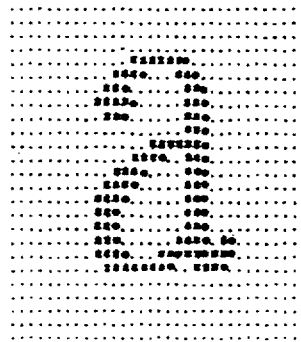
FIG. 9(c) shows a character pattern by a quasi-bold pattern of the standard character pattern.

If it is determined in step S30 that the designated type font is not the italic type font, the flow advances to step S32 wherein it is checked if the designated type font is the bold type font. If YES in step S32, the flow goes to step S33. In step S33, a character pattern is generated from the built-in character generator 204 at the position (x0, y0) designated by the line and row counters 210 and 211. After the character pattern is stored in the page output buffer 207, the same character pattern is generated at a position in the output page buffer 207 which is shifted to the right by one dot, that is, at a position (x0+1, y0) and stored therein. As a result of this, a quasi-bold pattern as shown in FIG. 9(c) is obtained from the character pattern generated by the built-in character generator 204 as shown in FIG. 9(a).

While type font designation data is present in the emphasis start position register 212, a quasi-character pattern is stored in the output page buffer 207.

When it is determined in step S32 that the designated type font is not the bold type font, a quasi-pattern is not generated in the apparatus of this embodiment but the flow advances to step S9 wherein a standard pattern is generated. However, the standard pattern need not be generated, but the corresponding portion may be left as a blank portion.

In accordance with the flow as described above, the character pattern is stored in the output page register 207 based on the type font change command and the character code data. When information representing an end of data (e.g., a code representing an end of a task, a code representing an end of a file, or the like) is detected in step S5, the flow goes to steps S18 and S19. When the output page buffer 207 is not empty, that is, when the line counter 210 is 2 or more or the row counter 211 is 1 or more, the contents of the page output buffer 207 are transferred to and printed by the page printer 209 through the interface 208. The entire processing is thus completed.

In the above embodiment, when a character generator for generator italic or bold type font characters is not mounted, a quasi-pattern is generated and is stored in the output page buffer 207. However, a message indicating this can be displayed by a display device, and a quasi-pattern can be generated in accordance with a response from the operator.

In this case, the output apparatus preferably allows the operator to select from the following alternatives:
(1) print with a standard pattern;
(2) generation of a quasi-pattern and printing in accordance with the generated quasi-pattern;
(3) blank (no printing); and
(4) stop printing.

The apparatus of the above embodiment is described with reference to printing wherein a dot image from the output page buffer 207 is printed by the page printer 209. However, the present invention can be similarly and easily adopted to all other kinds of output apparatuses for outputting an output from the output page buffer 207, such as CRT display devices or the like.

In the above embodiment, the pattern is partially modified. However, the entire page can be printed or displayed in accordance with a desired pattern. A test pattern print can also be instructed by the operator.

When a desired pattern can be generated from a built-in pattern generator or a removable character generator, the operator can produce a pattern signal from the selected character generator.

What is claimed is:

1. An image forming apparatus comprising:
   first pattern generating means for generating a first pattern signal corresponding to input information;
   second pattern generating means for generating a second pattern signal corresponding to input information, said second pattern generating means being removable with respect to the apparatus and storing specific data representative of particular characteristics of the second pattern signal;
   discriminating means for determining whether or not said second pattern generating means is mounted on the apparatus; and
   output means for outputting image data corresponding to the first pattern signal from said first pattern generating means and/or the second pattern signal from said second pattern generating means, said output means operating in accordance with said discriminating means and including modified image data output means for outputting modified image data corresponding to the input information by utilizing a pattern signal which can be generated by the apparatus even if the pattern signal corresponding to the input information is not present in the apparatus.

2. An image forming apparatus comprising:
   pattern generating means for generating a pattern signal representing a stored pattern corresponding to input information; and
   output means for outputting image data even if a stored pattern corresponding to the input information is not present in said pattern generating means, said output means including modified image data output means for outputting emphasis-processed image data formed by appending a specific signal to a predetermined position of the pattern signal generated by said pattern generating means or quasi-image data corresponding to the input information, the quasi-image data being formed by tilting a pattern signal generated by said pattern generating means.

3. An image forming apparatus according to claim 1, wherein said input information is code data, the apparatus further comprises means for inputting the code data, and said first and second pattern generating means generate said first and second pattern signals, respectively, in accordance with the code data inputted from said input means.

4. An image forming apparatus according to claim 3, wherein said discriminating means determines whether or not the characteristics of the second pattern signal generated by said second pattern generating means mounted on the apparatus is desirable on the basis of the specific data.

5. An image forming apparatus according to claim 4, wherein the specific data represents a typeface of the second pattern generated by said second pattern generating means.

6. An image forming apparatus according to claim 1, wherein the image data comprises dot data and wherein the apparatus further comprises means for reproducing an image in accordance with the dot data.

7. An image forming appaoratus according to claim 1, further comprising memory means for storing the first and second pattern signals generated from said first and second pattern generating means, respectively, said memory means being capable of storing the pattern signal corresponding to at least one page.

8. An image forming apparatus according to claim 1, wherein said modified image data output means outputs specific image data as well as the image data corresponding to the first pattern signal as the modified image data.

9. An image forming apparatus according to claim 8, wherein the specific image data represents an underline.

10. An image forming apparatus according to claim 2, wherein said modified image data output means modifies the pattern signal generated from said pattern generating means on the basis of the input information so as to output the emphasis-processed image data or the quasi-image data when a pattern corresponding to the input information is not present in said pattern generating means.

11. An image forming apparatus according to claim 10, wherein the input information is code data representing a pattern to be outputted.

12. An image forming apparatus according to claim 2, wherein the specific signal represents an underline.

13. An image forming apparatus according to claim 10, wherein the image data comprises dot data and wherein said modified image data output means includes memory means for storing the dot data.

14. An image forming apparatus according to claim 13, wherein said modified image data output means controls an address of said memory means to form the quasi-image data when the pattern signal generated from said pattern generating means is stored in said memory means.

15. An image forming apparatus according to claim 2, wherein said pattern generating means includes first pattern generating means incorporated in the apparatus for generating a first pattern signal and second pattern generating means for generating a second pattern signal, said second pattern generating means being removable with respect to the apparatus.

16. An image forming apparatus according to claim 15, further comprising means for discriminating whether or not said second pattern generating means is mounted on the apparatus, wherein said output means output the image data in association with said discrimination means.

17. An image forming apparatus according to claim 16, wherein said first and second pattern generating means change over in accordance with a predetermined instruction signal during outputting of one page of image data by said output means.

18. An image forming apparatus according to claim 1, wherein said first and second pattern generating means change over in accordance with a predetermined instruction signal during outputting of one page of image data by said output means.

* * * * *

UNITED STATES PATENT AND TRADEMARK OFFICE
CERTIFICATE OF CORRECTION

PATENT NO. : 4,715,006
DATED : December 22, 1987
INVENTOR(S) : SATOSHI NAGATA

It is certified that error appears in the above-identified patent and that said Letters Patent is hereby corrected as shown below:

COLUMN 2

Line 33, "ring" should read --ing--.

COLUMN 5

Line 27, "21" should read --210--.

COLUMN 6

Line 48, "x1=(lm+Xc-1)Xi x p" should read --x1=(lm+Xc-1)X x p--.

COLUMN 8

Line 11, "emphasis" should read --emphasize--.
Line 46, "retrieved" should read --retrieves--.

COLUMN 9

Line 2, "generating" should read --generated--.
Line 3, "porperly" should read --properly--.
Line 24, "X0=(lm+Xc)X x p" should read --x0=(lm+Xc)X x p--.
Line 54, "207." should read --208.--

COLUMN 10

Line 35, "S4." should read --204.--.

UNITED STATES PATENT AND TRADEMARK OFFICE
CERTIFICATE OF CORRECTION

PATENT NO. : 4,715,006
DATED : December 22, 1987
INVENTOR(S) : SATOSHI NAGATA

It is certified that error appears in the above-identified patent and that said Letters Patent is hereby corrected as shown below:

COLUMN 11

Line 30, "register" should read --buffer--.
Line 43, "generator" should read --generating--.

COLUMN 12

Line 65, "appaoratus" should read --apparatus--.

COLUMN 14

Line 16, "output" should read --outputs--.

Signed and Sealed this

Twenty-first Day of June, 1988

Attest:

DONALD J. QUIGG

Attesting Officer

Commissioner of Patents and Trademarks